United States Patent
Plumb (10) Patent No.: US 10,027,786 B2
(45) Date of Patent: Jul. 17, 2018

(54) CALL ESTABLISHMENT (71) Applicant: Microsoft Technology Licensing, LLC, Redmond, WA (US)

(72) Inventor: Graham Plumb, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 212 days.

(21) Appl. No.: 14/794,323

(22) Filed: Jul. 8, 2015

(65) Prior Publication Data

US 2017/0006147 A1 Jan. 5, 2017

(51) Int. Cl.
| | |
|---|---|
| H04M 1/56 | (2006.01) |
| H04L 29/06 | (2006.01) |
| H04M 7/00 | (2006.01) |
| H04M 3/42 | (2006.01) |
| H04M 1/725 | (2006.01) |
| H04M 1/2745 | (2006.01) |

(52) U.S. Cl.
CPC .......... H04M 1/56 (2013.01); H04L 65/1069 (2013.01); H04M 1/72519 (2013.01); H04M 3/42102 (2013.01); H04M 7/0021 (2013.01); H04M 1/274516 (2013.01)

(58) Field of Classification Search
None
See application file for complete search history.

(56) References Cited

U.S. PATENT DOCUMENTS

| | | |
|---|---|---|
| 8,249,078 B1 | 8/2012 | Hassan et al. |
| 8,275,829 B2 | 9/2012 | Plamondon |
| 8,533,186 B2 | 9/2013 | Lazaridis et al. |
| 8,732,314 B2 | 5/2014 | Surazski et al. |

(Continued)

FOREIGN PATENT DOCUMENTS

| | | |
|---|---|---|
| WO | WO-2003017621 | 2/2003 |
| WO | WO-2009079735 | 7/2009 |
| WO | WO-2014102318 | 7/2014 |

OTHER PUBLICATIONS

"International Search Report and Written Opinion", Application No. PCT/US2016/039702, dated Sep. 23, 2016, 12 pages.

(Continued)

*Primary Examiner* — Chirag Shah
*Assistant Examiner* — Srinivasa Reddivalam
(74) *Attorney, Agent, or Firm* — Schwegman Lundberg & Woessner, P.A.

(57) ABSTRACT

A behavior prediction algorithm predicts a call by monitoring user inputs to detect an action by the user suggesting the user may be about to instigate the call, and identifying a candidate callee for the call. A network address associated with the callee is also retrieved from a data store. In response to the behavior detection algorithm predicting the call, a connection establishment message is transmitted to the network address via a network, so as to establish over the network a signalling connection for transmitting messages to a device available to the callee. After the connection establishment message has been transmitted, an explicit instruction is received from the user to instigate the call to the callee. In response to receiving the explicit instruction, a call invite is transmitted to the device via the signalling connection, thereby causing the device to output an incoming call notification.

17 Claims, 4 Drawing Sheets

(56) References Cited

U.S. PATENT DOCUMENTS

| | | | |
|---|---|---|---|
| 8,769,005 B2 | 7/2014 | Madhani et al. | |
| 8,909,560 B2 | 12/2014 | Munson et al. | |
| 2005/0243979 A1* | 11/2005 | Starbuck | H04M 1/2473 |
| | | | 379/88.19 |
| 2007/0230679 A1* | 10/2007 | Altberg | H04M 7/006 |
| | | | 379/218.01 |
| 2008/0068998 A1 | 3/2008 | Jaggi et al. | |
| 2009/0141625 A1 | 6/2009 | Ghai et al. | |
| 2010/0296425 A1* | 11/2010 | Arsenault | H04L 12/66 |
| | | | 370/310 |
| 2010/0306185 A1 | 12/2010 | Smith et al. | |
| 2012/0023226 A1 | 1/2012 | Petersen et al. | |
| 2012/0185604 A1* | 7/2012 | Shatsky | H04L 67/306 |
| | | | 709/228 |
| 2013/0336308 A1* | 12/2013 | Laasik | H04M 7/0057 |
| | | | 370/352 |
| 2014/0074925 A1 | 3/2014 | Budin | |
| 2015/0078539 A1* | 3/2015 | Jain | H04M 3/493 |
| | | | 379/88.01 |
| 2015/0237189 A1* | 8/2015 | Schultz | H04M 3/4211 |
| | | | 455/414.1 |

OTHER PUBLICATIONS

Pack, "Reducing Call Setup Latency in Mobile VoIP Systems", In Proceedings: In Journal of IEEE Communications Letters, vol. 15, Issue 10, Oct. 2011, 3 pages.

Seol, "An Improved Mobile VoIP Call Setup with Pre-detection of Callee MS State Information", In Proceedings: In International Journal of Software Engineering and Its Applications, vol. 7, No. 2, Mar. 2013, 10 pages.

* cited by examiner

CALL ESTABLISHMENT

RELATED APPLICATION

This application claims priority under 35 USC 119 or 365 to Great Britain Application No. 1511474.7 filed Jun. 30, 2015, the disclosure of which is incorporated in its entirety.

BACKGROUND

Conventional communication systems allow the user of a device, such as a personal computer or mobile device, to conduct voice or video calls over a packet-based computer network such as the Internet between two or more users. Such communication systems include voice or video over internet protocol (VoIP) systems. These systems are beneficial to the user as they are often of significantly lower cost than conventional fixed line or mobile cellular networks. This may particularly be the case for long-distance communication. To use a VoIP system, the user installs and executes client software on their device. The client software sets up the VoIP connections as well as providing other functions such as registration and user authentication. In addition to voice communication, the client may also set up connections for other communication media such as instant messaging ("IM"), SMS messaging, file transfer, screen sharing, whiteboard sessions and voicemail.

A network may have layered architecture, a notable example being the Internet. The transport layer provides host-to-host (i.e. end-to end) connectivity between network nodes as a service to processes operating at the application layer. Various protocols may be implemented at the transport layer. A transport layer protocol may be connection-oriented, e.g. TCP (Transmission Control Protocol), or connectionless, e.g. UDP (User Datagram Protocol). Connection-oriented protocols provide for the establishment of formal, end-to-end connections between hosts through an exchange of connection establishment messages, such as the well-known TCP three-way handshake (SYN, SYN+ACK, ACK). TCP is a reliable protocol, i.e. successful receipt of TCP packets is acknowledged to the sender and retransmission is attempted automatically in the event of failure, at the cost of increased latency. UDP provides no automatic retransmission or acknowledgments mechanisms, making it unreliable though less prone to latency.

A VoIP call has two distinct stages: signalling and media flow. During the initial signalling stage, a calling endpoint sends a call invite (such as an SIP INVITE) to a callee endpoint(s). Among other things, this causes the callee device to enter a ringing state, in which information, such as an audible ringing, is outputted to a user of the callee device (the callee) to inform them of the incoming call. Assuming the callee is willing to accept the call, call acceptance is signalled from the callee device to the caller device. Media parameters are negotiated during the signalling stage, to enable media such as call audio and/or video to flow between the devices in the media flow stage. The signalling is generally controlled at the application layer, for example by SIP (Session Initiation Protocol) software stacks running on the devices. Different transport layer protocols can be used for signalling and media flow: for example, SIP may operate over TCP in the signalling stage whereas media may be transmitted over UDP in the media flow stage, as often latency is more of a concern than datagram loss at this stage.

In the context of a VoIP call, end-to-end does not necessarily refer to the path between the caller and the final destination. Where signalling is performed via route involving one or more intermediate nodes of the network operating as transport layer entities—such as proxy servers, peer-to-peer (P2P) nodes, bridges (e.g. PSTN bridges), or some NATs (Network Address Translators)—separate end-to-end connections are established between each pair of nodes (including the endpoints) along the route to provide an overall path to the final callee destination.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A processor executes a behaviour predication algorithm. User inputs are received at the processor from a user via a user interface. The behaviour prediction algorithm predicts a call by: monitoring the user inputs to detect an action by the user that suggests the user may be about to instigate the call, and identifying a candidate callee for the call (that is, the behaviour prediction algorithm predicts when the user may be about to place a call to the candidate callee before they have actually done so). The processor accesses a data store to retrieve a network address associated with the callee in the data store. In response to the behaviour detection algorithm predicting the call, the processor transmits a connection establishment message to the network address via a network, so as to establish over the network a signalling connection for transmitting messages to a device available to the callee (though no call invite is actually sent via the signalling connection in response to this detection).

The network address may, for example, be a local network address of a device available to the callee device, a network address of a proxy server or P2P node able to relay messages to the calling device (possibly via one or more other proxies/peer-to-peer nodes), a public network address of a NAT behind which the callee device is located, a bridge to another network (e.g. PSTN bridge), or some other network address configured such that messages directed to it are (eventually) relayed to the callee device.

After the connection establishment message has been transmitted, the processor receives from the user via the user interface an explicit instruction to instigate the call to the callee. For example, the user may input the explicit instruction by selecting a call option displayed on a display of the user interface, or as a vocal instruction (based on voice recognition), gesture etc. In response to receiving the explicit instruction, the processor transmits a call invite to the device via the signalling connection, thereby causing the device to output an incoming call notification—for example an audible ringing, visual notification, tactile notification (e.g. based on vibrations) etc.

DETAILED DESCRIPTION OF EMBODIMENTS

In existing systems, the establishment of a signalling connection—to be used for signalling in the signalling stage of a call—is triggered only when the caller, i.e. the user initiating call, actually instructs the calling device to call a target user (callee). Depending on the circumstances, the signalling connection can take a considerable amount of time to establish, e.g. several seconds, or even more in extreme cases. This in turn can result in a considerable delay between the caller placing the call, and the callee being notified as the call invite (e.g. SIP invite) cannot be sent until the signalling connection, via which it is transmitted, has been established.

For example, when making a conventional VoIP call, one of the first steps in its placement is to open a network connection (e.g. either to a server or a P2P node) in order to establish a transport for call signalling to the target client. The network connection may, for example, be a TCP connection, or other end-to-end (i.e. transport layer) connection.

For P2P or cross-bounds B2B calls, this may trigger a series of negotiations across multiple network boundaries, routers and firewalls—a process which can take a considerable amount of time depending on where a given endpoint exists. For a conventional call set up, this step must occur before call signalling begins, so the considerable time costs in initially setting up network communication often leads to a poor user experience and the perception that the VoIP client is slow or unreliable.

By contrast, in accordance with the present subject matter, the timing is shifted so as to, at the very least, commence the establishing of the signalling connection before the user has actually placed the call to the callee, based on intelligent predictions of the user's behaviour by a behaviour prediction algorithm. Thus, if and when the user does explicitly place the call, at the very least the connection establishment is already underway and may even have been completed (so that the signalling connection is already established).

In other words, the network negotiation phase of a call begins before a user has actually indicated their intent to place that call, in order to perceptibly cut the time needed to dial and ring a contact's various endpoint(s), such as a mobile phone, a physical landline or another computer.

This reduces call set up times, thereby providing an improved user experience.

This occurs in a manner that is independent of the VOIP clients' call signaling in order to make sure that the target users' endpoints don't ring unnecessarily. That is the establishment of the connection to be used for signalling is triggered independently from the signalling itself. For example, in the embodiments below, a client API provides separate functions for establishing a signalling connection and instigating signalling via that connection (once established) respectively.

Figure 1:
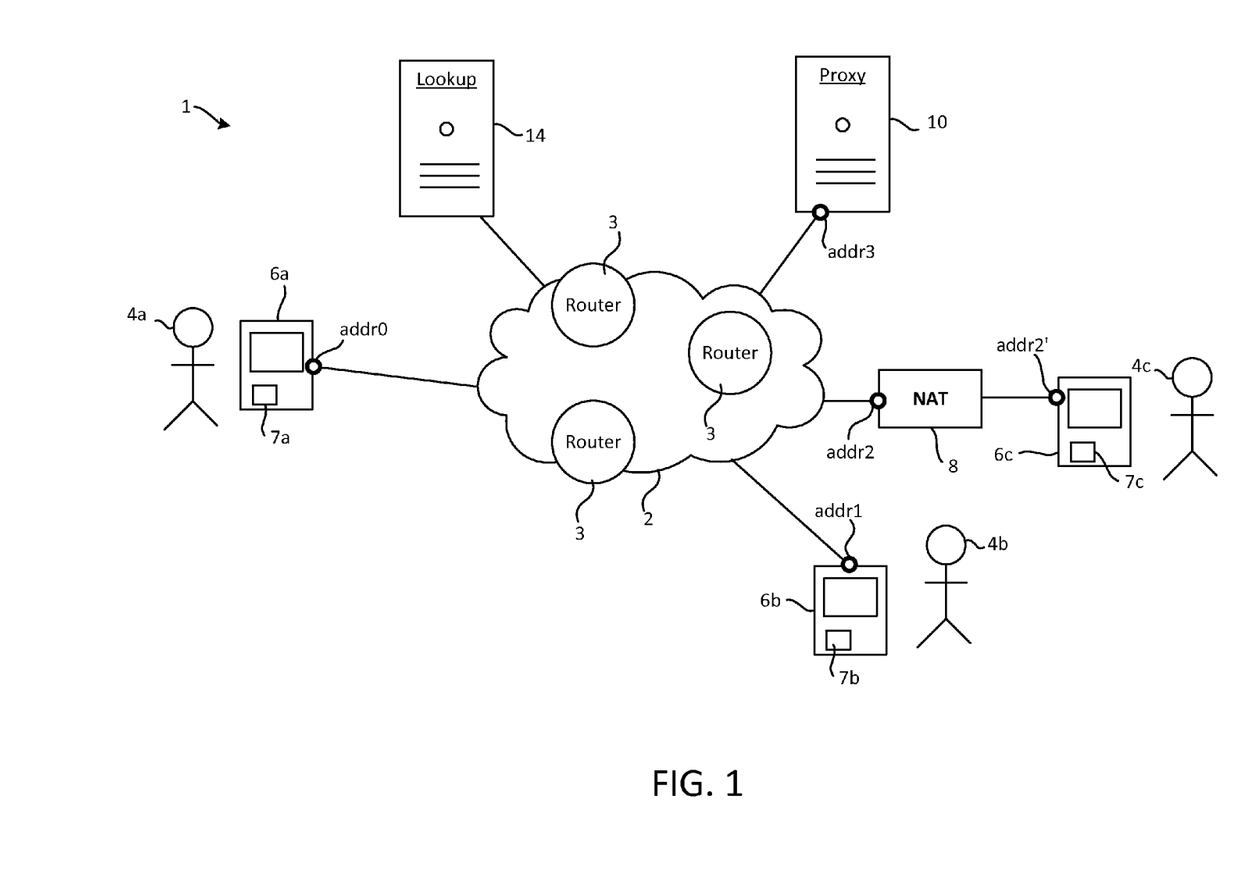
FIG. 1 shows a schematic illustration of a communication system.

FIG. 1 shows a communication system 1, in which embodiments of the subject matter can be implemented.

The communications system 1 is shown to comprise a communications network, which is an internet 2 such as the Internet (capital I). The internet comprises routers 3 which route traffic between individual networks of the internet 2. First, second and third user devices 6a, 6b, 6c; a proxy server 10; and a location server 14 are shown as connected to the internet 2. The third user device 6c is connected to the internet 2 via a NAT 8.

The first and second user devices 6a, 6b each have a respective network address addr0, addr1 local to that device. In this example, the network addresses addr0, addr1 are addresses in a network address space of the internet 2 e.g. the public address space of the Internet, so that the first and second user devices are directly addressable within the internet 2. The NAT 8 and the proxy server 10 also each have a respective network address addr2, addr3 in the public address space. By contrast, the third user device 6c has a private local network address addr2', and is thus only directly addressable by other devices located behind the same NAT 8. The public address addr2 of the NAT 8 is assigned to the third user device 6c. The NAT 8 provides an interface between the internet 8 and the third user device 6c, by replacing the private address addr2' in outgoing messages from the user device 6c with the public address addr2, and forwarding messages directed to the public address addr2 from the internet 2 to the private address addr2' of the third user device 6c. The NAT 8 may for example be configured as a firewall so as to control the flow of traffic between the internet 2 and the third user device 6c, and provide security.

Each of the user devices 6a, 6b, 6c runs a respective instance of communication client software 7a, 7b, 7c. The client enables the user devices 6a, 6b, 6c to establish real-time voice or video calls over the internet 2, with call audio and/or video being transmitted and received over the internet 2 during the call once established. The communication is "real-time" in the sense in that there is only a short delay, for instance about 2 second or less, between audio/video being captured at a near-end device and received and outputted by the far-end device. The client may for example be a stand-alone application that is executed on a processor of the relevant user device and runs on top of an operating system, or a plugin to another application executed on the processor such as a Web browser.

Figure 2A:
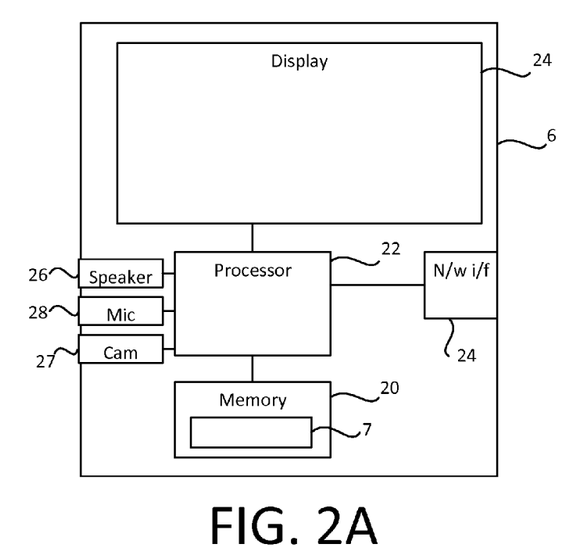
FIG. 2A shows a block diagram of a user device.

FIG. 2A shows a block diagram of a user device 6 (e.g. 6a, 6b, 6c). The user device 6 is a computer device which can take a number of forms e.g. that of a desktop or laptop computer, mobile phone (e.g. smartphone), tablet computing device, wearable computing device, television (e.g. smart TV), set-top box, gaming console etc. The user device 6 comprises a processor 22 to which is connected a memory 20, input apparatus, output apparatus, and a network interface 24 such as an Ethernet, Wi-Fi or mobile network (e.g. 3G, LTE etc.) interface which enables the user device 6 to connect to the network 1. The output apparatus may for example comprise a display 24 and/or a loudspeaker(s) 26. The input apparatus may for example comprise a camera 27, a microphone 28, and/or a touchscreen mechanism of the display 24. Any of the various components shown connected to the processor may be integrated in the user device 6, or non-integrated and connected to the processor 22 via a suitable external interface (wired e.g. Ethernet, USB, FireWire etc. or wireless e.g. Wi-Fi, Bluetooth, NFC etc.).

The memory 20 holds a copy of the client 7 which, when executed on the processor 24, causes the user device 6 to implement the functionality of the client 7.

Figure 2B:
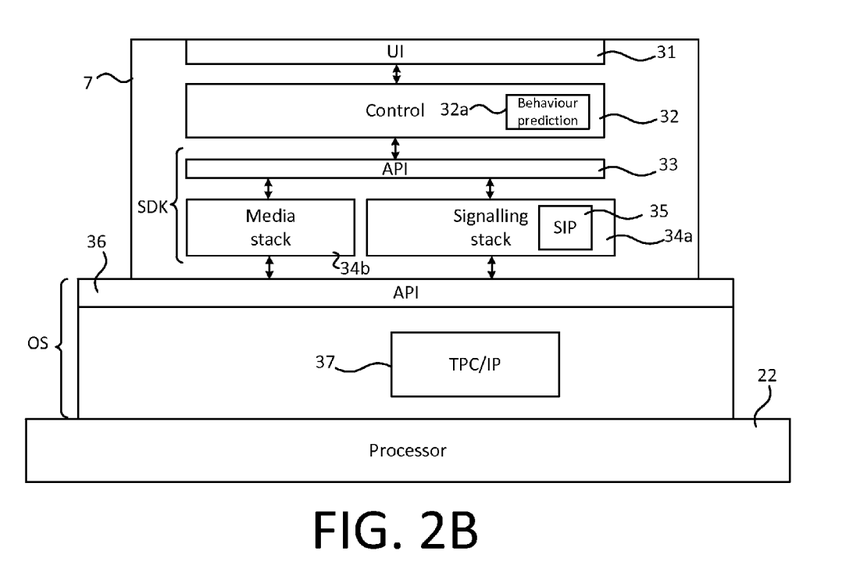
FIG. 2B shows software stacks running on a user device.

FIG. 2B shows various software modules 31-35 of the client 7, with arrows representing interactions between them. The client software 7 is represented as a stack, whereby software modules of the client 7 are arranged vertically on the page according to the level of service they provide. The software towards the top of the stack generally provides higher-level (more abstracted) functionality, and the software towards the bottom of the stack performs lower-level (more detailed) operations.

At the top of the client software stack 7, a user interface module 31 provides the user interface functionality of the client 7, by controlling the output apparatus of the user device 6 to output information to a user of the user device 6 and controlling the input apparatus to receive information from the user. The user interface software 31, input apparatus and output apparatus constitute a user interface of the user device 6.

The user interface module 31 may for example provide graphical user interface (GUI) functionality, whereby information is outputted via the display 24, and/or natural user interface (NUI) functionality to enable the user to interact with a device in a "natural" manner, free from artificial constraints imposed by certain input devices such as mice, keyboards, remote controls, and the like. Examples of NUI methods include those utilizing touch sensitive displays, voice and speech recognition, intention and goal understanding, motion gesture detection using depth cameras (such as stereoscopic or time-of-flight camera systems, infrared camera systems, RGB camera systems and combinations of these), motion gesture detection using accelerometers/gyroscopes, facial recognition, 3D displays, head, eye, and gaze tracking, immersive augmented reality and virtual reality systems etc.

Below the UI module 31, a control module 32 provides high-level control operations to process and act upon user inputs received by the UI module 31, and control the UI module 31 to output information received from lower down the stack. The control module 32 also implements "background" process i.e. that are not explicitly controlled by the user, but which are intended to improve the user experience. These are not be visible to the user, in the sense that are not communicated explicitly to the user via the client's own UI software 31 (visually or otherwise).

In particular, the control module 32 is configured to implement a behaviour prediction algorithm 32a, details of which will be described in due course. Suffice it to say, the algorithm 32 predicts when a user of the user device 6 may be about to place a call. To this end, the prediction algorithm 32a runs on the processor 22 as a background process and, whilst running, analyzes interactions between the user and the user interface of the user device 6, so as to detect what are referred to herein as "call suggestive actions". A call suggestive action is an action by the user, which suggests that the user may be about to place a call. That is, by detecting the call suggestive action, the algorithm 32a predicts a later action by the user in the near future, the later action being the user actually placing the call. The prediction algorithm also identifies at least one candidate callee for the call, i.e. that the user is likely to place the call to. There a number of different ways in which the candidate callee(s) can be identified, some examples of which are provided below.

Below the control module 32, separate signalling and media stacks 34a, 34b of the client 7 provide signalling and media flow functionality respectively. That is, the signalling stack 34a implements the functionality needed to perform the signalling stage of a call, in which (amongst other things) media parameters are negotiated so as to enable the media stack 34b to then send and receive media data to/from the callee(s).

The signalling stack 34a comprises one or more application-layer signalling protocol stacks, such as an SIP stack 35 configured to implement SIP signalling.

The controller 32 can interact with the signalling and media stacks 34a, 34b using an API (Application Program Interface) 33 of the client 7, between the controller 33 and media/signalling stacks 34a/34b. The client API 33 hides details of the functions performed by the signalling/media stacks 34a/34b from the higher-level controller 32. For example, a higher-level function implemented by the client API 33 may, when invoked by the controller 32, trigger various lower-level operations by the signalling stack 34a, media stack 34b, or both that are not directly visible to the controller 33. On the one hand, from the perspective of a software developer, this makes it simpler to write the code of the controller 32; on the other hand, this typically leaves the controller 32 unable to control all of the finer details of the operations of the signalling and media stacks 34a, 34b.

As explained in further detail below, in various embodiments of the present subject matter, the client API 33 does expose more of the signalling stack 34a to the controller 32 than a conventional client API operating at the same or similar level in the overall client stack, in the sense that it is configured to allow the controller 32 to trigger the establishment of a signalling connection to be used in a signalling phase of a call separately from the signalling phase itself e.g. by providing separate connection establishment and signalling instigations functions, denoted prepareForCall( ) and placeCall( ) herein for convenience.

For a P2P client like Skype, prepareForCall( ) can be invoked by a command message (which is supressed from display by the UI software 31) that instructs CoreLib, Café or some other underlying client stack beneath the client API 33 to establish the relevant network connection(s).

For a server-based client like Lync, this can be an extension of the API that instructs the UCCP/UCMP stack to establish the relevant network connection(s).

Once the connection is established, the SIP signalling may still be the same as it would be otherwise (INVITE, TRYING, RINGING etc.), but by means of the above a connection has been pre-established in order to send the INVITE.

As an example, the media and signalling stacks 34a, 34b may form part of an SDK (Software Development Kit), which provides core signalling and media flow functionality to a software developer's bespoke code user interface code 31 and high-level control code 32. The SDK may also provide some higher-level functionality—corresponding to the part of the overall client stack between the client API 33 and signalling/media stacks 34a, 34b—such as different communication modality services (audio, video, instant messaging etc.), conferencing and presence services etc. which are made available to the controller 32 via the client API 33.

The client 7 is an application in this example, and is shown running on top of an operating system ("OS") accordingly. Among other things the OS implements a TCP/IP stack 37, and thereby implements at least some of the functionality of the TCP/IP suite. Note in accordance with common parlance, the TCP/IP suite refers to the well-known Internet Protocol Suite and is not merely TCP and IP (Internet Protocol). The TCP/IP stack is responsible for setting up end-to-end (i.e. transport layer) connections between the user device 6 and another host, and is controllable by the media and signalling stacks 34a, 34b of the client 7 via an API 36 of the OS.

Note: whilst in this example the behaviour prediction algorithm 32a is implemented by the client application 7, in other embodiments it may be implemented by a separate application or, more generally, by any suitable code running on the processor 22.

Figure 3:
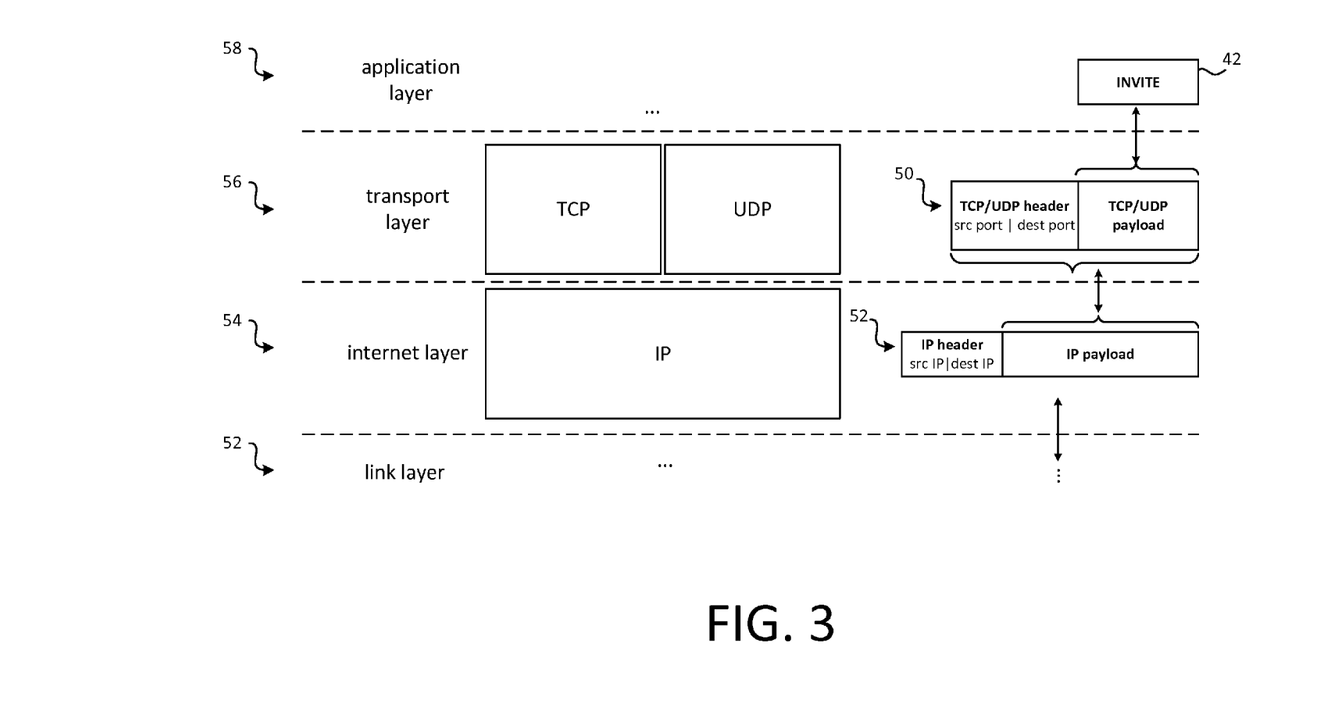
FIG. 3 illustrates principles of a layered network architecture.

FIG. 3 provides a high-level overview of the architecture of the network 2. As shows, the network 2 has a layered architecture, whereby the functionality of the network 2 is organized into abstracted layers.

In this example, the network 2 is based the TCP/IP protocol suite, whereby its functionality is organized into four layers 58-52: an application layer 58 comparable to a combination of layers 5, 6 and 7 of the OSI ("Open Systems Interconnection") model; a transport layer 56 below the application layer 58 and comparable to layer 4 of the OSI model; a network (or internet) layer 54 below the transport layer 106 and comparable to layer 3 of the OSI model; and a link layer 52 below the internet layer 54 and comparable to a combination of layers 1 and 2 of the OSI model.

The application layer 58 provides process-to-process communication between processes running on different hosts i.e. general purpose computer devices connected to the network 1 such as user devices 6 and servers 10, 14.

The transport layer 56 provides end-to-end communication between different hosts, including providing end-to-end connections(s) between hosts for use by the processes.

The internet layer 54 provides routing i.e. communication between different individual networks of the internet 1, via the routers 3.

The link layer 52 provides communication between physical network addresses—for instance, MAC ("Medium Access Control") addresses—of adjacent nodes in same individual network the internet 1 e.g. via network switches and/or hubs etc. which operate at the link layer 102.

Application layer data (e.g. SIP data) to be transmitted over the network 2 is passed at a transmitting host from the application layer 58 to the transport layer 56, at which it is packetized into transport layer packet(s) 50 in accordance with a connection-oriented transport layer protocol such as TCP.

The data of the transport layer packet(s) 50 are then passed to the internet layer 52 at that host, at which the data is further packetized into IP datagram(s). The data of the IP datagram(s) are then passed to the link layer 52 for transmission over the network 2 to a receiving host.

When received at the receiving host, the data of the IP datagram(s) is passed up to the internet layer 54, at which the data of the transport layer packet(s) 50 is extracted from the payload(s) of the IP datagram(s) 52 and passed up to the transport layer 56, at which the application data is extracted from the payload(s) of the transport layer packet(s) 50 and passed up to the application layer.

In particular, application data can take the form of a call invite 42 (e.g. SIP INVITE) generated by the signalling layer 34a of the client 7. In the example below, signalling is performed over a connection-oriented protocol, specifically TCP. The call invite 42 is packetized into one or more TCP packets at the transport layer 56, which are transmitted via an established TCP end-to-end connection.

Herein the general terminology "end-to-end connection" means a logical link established at the transport layer.

Returning briefly to FIG. 1, each of the network addresses addr0, addr1, addr2, addr3 is a transport address, formed by the combination of a network layer address (e.g. IP address) and port number. The port number is primarily used at the transport layer, and provides multiplexing over a single IP address so that multiple processes can share the same IP address at the same time.

A TCP connection is established between a source transport address and a destination transport address, or more specifically between two sockets, each created at the source and destination hosts respectively and bound to the transport address of that host. A socket is a software entity executing at a host device which operates as an interface between a process running on that host and the network 2.

TCP packets sent via that connection have headers which include the source and destination port number, and are packetized into IP packet(s) having headers which include the source IP and destination IP addresses.

In this example, a socket is created at the user device 6 and bound to a transport address of the user device 6 by the OS. The OS can be controlled to do this by the signalling stack 34a using the OS API 36, for example by the signalling stack 35 invoking socket creation and socket binding functions provided by the OS API 36. To establish an end-to-end connection between the created socket and a remote socket on a remote host, a connection establishment function provided by the OS API 36 can be invoked by the signalling stack 34a.

Figure 4A:
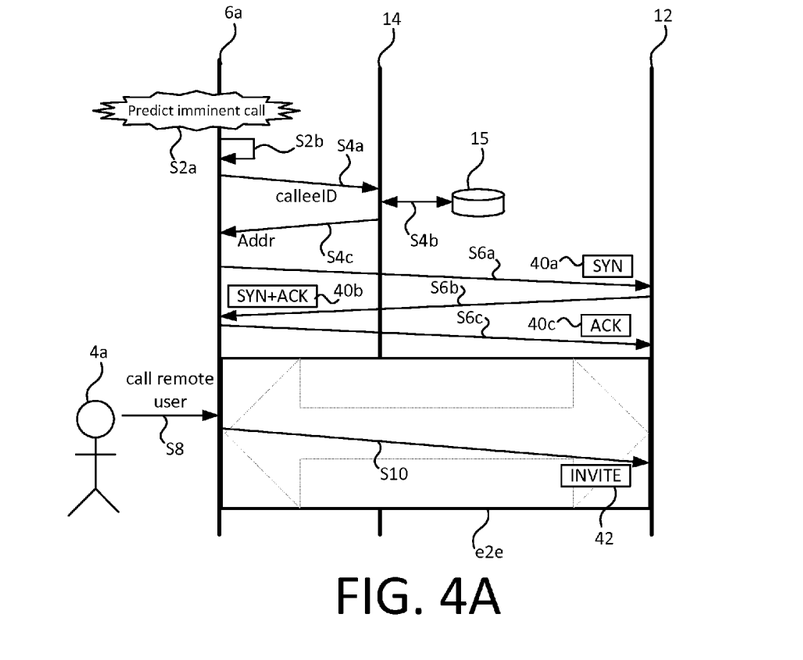
FIG. 4A shows a signalling diagram for a call establishment procedure.

FIG. 4A shows a signalling diagram for a signalling phase of call establishment procedure in accordance with the present subject matter. In this example, the first user 4a instigates a call to a callee using the first user device 6a as a calling device, which is predicted beforehand by the prediction algorithm 32a.

As indicated above, the behaviour prediction algorithm 32a runs, in the background, on the calling device 6a. Whilst running, it analyses inputs from the caller 4a at the user interface of the calling derive, in order to detect a call suggestive action by the user. At step S2a, in performing this analysis, the behaviour prediction algorithm 32a detects a call suggestive action by the user, and thereby predicts when the caller may be about to place a call. The behaviour prediction algorithm 32a also identifies one or more candidate users (callees) for the call i.e. to which the call is most likely to be placed. The algorithm 32a can use various types of data to identify a candidate callee, some examples of which are given below.

In response to this prediction of step S2a, the behaviour predication algorithm triggers (S2b) a background network-connection negotiation (S6a-S6c), so as to establish a respective signalling end-to-end connection ("e2e") between the calling device 4a and each of the identified, candidate callee(s). The following example assumes one candidate callee, though as will be readily apparent where there are multiple candidate callees the steps can be performed separately, in tandem, for each candidate callee.

There are a number heuristics that the behaviour prediction algorithm 32a can use to decide when to initiate the background network-connection negotiation (S6a-S6c).

As a first example, the call suggestive action may be the user instantiating (i.e. opening) the client application 7a, as this suggests that the user may be about to place a call to someone. More generally, the call suggestive action may be some interaction of the caller 4a with the client 7a which suggests they may be about to place some kind of call, but which may not be particularly revealing as to whom the caller 4a intends to call per se.

In this first type of scenario, the behaviour prediction algorithm can use various types of historic data to identify a candidate callee.

For example, in some cases a candidate callee may be identified based on contact information in an electronically-stored address book, which identifies the caller's contacts. In particular, the candidate callee may be a contact of the caller 4a which the caller 4a has previously marked as a "favourite" contact, and selected as candidate on that basis.

To enable the caller 4a to mark a candidate as a favourite, the UI software 31 of the client 7 is configured to receive from the caller 4a an instruction to mark the callee as a favourite contact in the address book, at some earlier point in time. In response, the client 7 updates favourite contact data in the address book so as to mark the callee as a favourite contact. When the address book is displayed, contacts marked as favourite may be highlighted as such on the display (e.g. by displaying an icon, such as a star, next to their contact details). Behind the scenes, a candidate callee can be identified using the favourite contact data by the prediction algorithm 32*a*.

Alternatively or in addition, a candidate callee may be identified in this first type of scenario based on an electronically-stored call history of the callee.

In some cases, a call likelihood metric is assigned to the callee by the client 7 based on an electronically-stored call history of the user, and the transmitting of the connection establishment message before the explicit instruction has been received is conditional on the determined metric satisfying one or more conditions.

The metric may for example be a score. That is, in tracking how frequently calls are placed to a given contact (or a non-contact which the user has called in the past), a score may be assigned to that user (which would decay over time) to determine the likelihood of a call being placed to that contact.

The score assigned to another user may, for example, comprise a probability of the user calling the other user, and that other user may be identified as a candidate callee only if the probability is currently above a threshold. As another example, the score may be a ranking of the other user relative to other users which the callee has called, and the connection establishment message is transmitted before the explicit instruction has been received only if the callee is one of the N (≥1) highest ranked users—the N highest ranked users being the N users the callee is statistically most likely to call.

The address book and call history may be stored and accessed locally at the calling device 6*a*, or they may be stored at remote memory locations and accessed via the network 2.

As another example, a candidate callee may be unknown to the user previously (i.e. not necessarily a contact, or someone they have called before). In this case, the call suggestive action may be the user searching for relevant information.

For example, a candidate callee may be presented to the user as the result of a contextually relevant query e.g. when a software-implemented personal assistant, such as Cortana or Siri, lists plumbers that are available in the immediate vicinity of a user's residence, in response to the user requesting nearby plumbers using spoken instructions. One or more of the listed plumbers can then be selected as a candidate callee.

That is, in one scenario, a query is performed using the user device 6 (e.g. a search for a service in a locality) and the response (e.g. a Bing, or other third party service) that is presented to a user of the mobile device includes one or more links/contact information (e.g. audio/video call links), or otherwise identify one or more candidate callees. In this scenario, the search results may identify callable entities which are hitherto unknown to the callee.

As a particular example, the pre-emptive call action may be the user submitting a query via the network 2 to a search engine (e.g. Bing, Google etc.), which searches the World Wide Web based on Web crawler algorithms One or more of a set of search results returned by the search engine via the network 2 may identify a callable entity.

In this scenario, one or more callable entities identified in the search results are identifies as candidate callees by the prediction algorithm 32*a*.

For example, search results are typically ranked, e.g. according to assumed relevance, and a subset of the highest ranked search results may be used to identify one or more candidate callees.

Other examples of suggestive call actions by the caller 4*a* are:

- The caller 4*a* controlling a cursor to hover over a visual representation of a another user e.g. contact such as an avatar or display name, or an option (e.g. link) that is selectable to call that other user;
- The user clicking on (or otherwise selecting) a visual representation of another user, provided this is not an explicit call action e.g. selecting the visual representation may display contact details of the other user, but not place a call to the other user.

As another example, a selectable call initiation option to call another user may be somehow outputted via the UI of the calling device (e.g. by displaying it on the display, or an as audio). The behaviour prediction algorithm predicts when the user may be about to select the option by monitoring user inputs at the user interface, and triggers the network negotiations in response. However, the call itself is only placed when the user actually selects the option.

To be able to perform the negotiations (S6*a*-S6*c*), the client 7 looks up at least one network address associated with each identified candidate callee (S4*a*-S4*c*). In this embodiment, this look-up is also triggered by the prediction—in other embodiments, it may be performed earlier. In any event, it should be noted that the prediction S2*a* does not merely trigger the lookup (S4*a*-S4*c*)—it also triggers the subsequent procedure to establish a signalling connection (S6*a*-S6*c*). The signalling connection is such that it can be used to send a call invite to the callee, though no call invite is actually sent until the user explicitly places the call (SS8).

In order to establish the signalling connection, at least one target network address associated with the candidate callee is needed.

A data store 15 of the lookup server 14 holds a network address set of one or more network addresses associated with an identifier of the candidate callee. For example, the callee identifier may be a username or a PSTN telephone number of the callee. These network addresses are subject to change, for example as the callee switches between different devices, locations, or simply over time; by contrast, the callee identifier provides a consistent identity of the callee within the system 1.

Each address in the set is a network address of a network node 12 of the network 2, to which an end-to-end signalling (e.g. TCP) connection can be established from the calling device 4*a*. The node 12 may for example be:

- a user device (e.g. 4*b*, 4*c*) available to the callee e.g. at which they are currently logged on;
- a server (e.g. 10) or P2P node (e.g. the second user device 4*b*), capable of relaying messages to such a user device (e.g. the third user device 4*c*, which may be necessary due to the presence of the NAT 8), possibly via one or more other servers/P2P nodes;
- a network address translator (e.g. 8), to which a device available to the callee (e.g. the third user device 4*c*) is connected;
- a bridge (e.g. PSTN bridge), in the case of a call being placed to a telephone number.

The network address of the node 12 may be a transport address of that node 12, or an IP address may be sufficient e.g. if a default port on that node 12 is used for incoming call invites.

At step S4a, the calling device 6a requests the network address set associated with an identifier of the candidate callee ("calleeID") from the lookup server 14 via the network 2. The lookup server 14 retrieves the network address set from the data store 15 (S4b) and transmits it to the calling device 6a (S4c) in response. Steps S4a-S4c constitute a remote access operation by the calling device 6a (though a local access may be performed instead if some or all of the information is available locally at the calling device 6a).

In response the prediction by the prediction algorithm 32a, the client control software 32 controls the signalling stack 35 to commence the necessary connection establishment procedure so that, if and when the user does actually place the call, it can be established quickly. In this example, this is by the client control software 32 invoking the prepareForCall( ) function provided by the client API 36.

In turn, the signalling stack 34a of the client 7 controls the TCP/IP stack 37 of the OS, via the OS API 36, to begin the background negotiation. During the background negotiation, the TCP/IP stack attempts to set up a signalling connection, in the form of an end-to-end TCP connection ("e2e" in FIGS. 4A and 4B) to at least one network address in the network address set retrieved at steps S4a-S4c. This negotiation is a background negotiation in the sense that it is not revealed to callee 4a directly via the user interface software 31 of the client application 7a (though the negotiation may be visible to a curious user e.g. using a separate network analysis application running on the calling device 6a).

The background negotiation begins by the calling device 6a instigating (S6a) a first connection establishment message 40a to the at least one network address, which is a TCP SYN message in this example. Assuming the first message 40a is successfully received at the network node 12, the network node 12 returns (S6b) a second connection establishment message 40b to the calling device 6a in response, which is a TCP SYN+ACK message. In response to the second message S6c, the calling device transmits (S6c) a third connection establishment message 40c back to the network node 12 in response, which is a TCP ACK message. The three-way exchange of steps S6a-S6c constitutes a TCP three-way handshake, the concept of which is well established in the art. As will be readily understood, successful completion of the three-way handshake establishes the TCP connection e2e between the calling device 6a and the network node 12.

In some cases, attempts are made to set up a TCP connection to each network address (or at least multiple network addresses) in the network address set in this manner simultaneously.

At step S8, an explicit instruction is received from the caller 4a at the user interface of the calling device 6a. The instruction can be received in a number of different ways.

As a first example, the user may select a displayed option to call the callee using a touchscreen, trackpad mouse etc. As a second example, the processor 22 of the calling device 6a may implement a speech recognition (e.g. as part of the OS, client 7 or other application running on the processor 22), which receives, via the microphone 28, and interprets a spoken instruction from the caller 4a to call the callee.

A spoken instruction is beneficial, as it takes minimal time and effort to establish the call. The combination of this with the reduced call set up time (due to the behaviour prediction) makes the client 7 appear highly responsive to the callee 4a, and therefore provides an optimal user experience.

In response to the explicit instruction of step S8, at step S10 the calling device 6a transmits a call invite 42 (e.g. SIP INVITE) to the network node 12. Where the network node 12 is a user device (e.g. 4b, 4c) available to the callee, this is transmitted directly to that device 12 and causes it to enter a ringing state to notify the callee of the incoming call. Where the network node 12 is a server or P2P node (or NAT 8), the invite 42 is relayed (or routed) on from the network node 12 and eventually arrives at a device that is accessible to the callee 12. Either way, transmitting the call invite 42 causes a device available to the callee to enter a ringing state, even if it is not transmitted directly to that device from the calling device 6a.

Thereafter, the signalling phase of the call establishment procedure can proceed in the same manner as a conventional signalling phase, so as to establish the call.

Considering the signalling flow of FIG. 4A as a whole, it should be noted that, at the very least, the first step S6a of the network negotiations is performed before the explicit instruction has been received from the caller at step S8. This reduces the interval between the time at which the user 4a instructing the call at step S8, and the time at which the calling client 7a can send the call invite 42. Depending on how much time passes between the prediction of step S2a and the user 4a instructing the call at step S8, by the time the user instructs the call at step S8 the connection e2e may have already been established (at least in the direction from the calling device 6a to the network node 12), in which case the call invite 42 can be sent immediately via the already-established connection e2e.

The behaviour prediction algorithm 32a monitors user inputs at the user interface. This may be direct monitoring of the inputs themselves, or indirect monitoring e.g. based on direct monitory of other events they cause. For example, search engine queries inputted via the UI may be monitored indirectly based on the responses returned by the search engine, instead of or in addition to direct monitoring of the queries themselves.

Exactly when the behaviour prediction algorithm 32a instigates the establishment of the connection e2e pre-emptively (i.e. step S2b) will be context dependent. For example, in the case of a connection e2e which has a timeout duration, such as a TCP connection, after which the connection e2e is terminated automatically, the behaviour prediction algorithm 32a may be configured so that the connection instigation step S2b is not triggered unless the probability of the user instructing the call (step S8) within the timeout duration increases substantially (i.e. by a non-negligible amount). In other words, step S2b may be performed only when there is a non-negligible increase in the probability of the user instructing the call within a predetermined interval of time, e.g. which may be chosen to match the timeout duration, so that a signalling connection is not established when there is no statistically significant increase in the probability of the caller 4a using it before it times out.

Figure 4B:
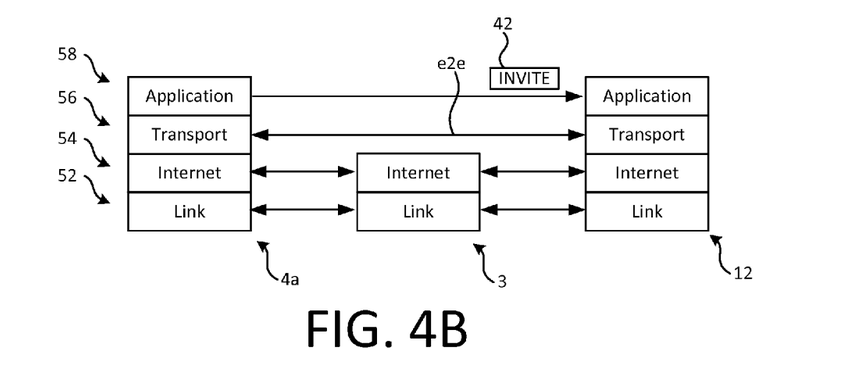
FIG. 4B shows various connectivity between protocol stacks.

As illustrated in FIG. 4B, the end-to-end e2e connection is between respective transport layer entities at the calling device 6a and network node 12. The call invite 42 constitutes application layer signalling, via the end-to-end connection e2e. Below the transport layer, data set via the end-to-end connection e2e may travel via devices, such as routers 3, operating at lower layers, though this is not directly visible at the transport layer.

It should be noted that the call invite 42 sent via the end-to-end connection e2e is the very first call invite sent via that connection e2e. No such call invite is sent via the connection e2e in response to simply detecting the action by the user at step S2a—if the user does not place a call to the callee in time (i.e. if no explicit instruction is received in time), the connection e2e simply times out and is not used to send any call invite.

In some embodiments, the connection e2e is reused where appropriate—for example if the user attempts a second call to the same callee whilst the connection e2e is still open, the connection is re-used to send a second call invite where appropriate (rather than establishing a new connection based on predicted behaviour). This is in response to a second explicit instruction form the caller 4a to call the callee again.

Whilst embodiments have been described with reference to TCP, as will be appreciated, all of the description pertaining to TCP applies equally to any other connection-oriented transport layer protocol.

According to one aspect of the present disclosure, there is provided a computer-implemented call establishment method comprising implementing, on a processor executing a behaviour detection algorithm, the following steps: receiving user inputs from a user via a user interface, wherein the behaviour prediction algorithm predicts a call by: monitoring the user inputs to detect an action by the user that suggests the user may be about to instigate the call, and identifying a candidate callee for the call; accessing a data store to retrieve a network address associated with the callee in the data store; in response to the behaviour detection algorithm predicting the call, transmitting a connection establishment message to the network address via a network, so as to establish over the network a signalling connection for transmitting messages to a device available to the callee; after the connection establishment message has been transmitted, receiving from the user via the user interface an explicit instruction to instigate the call to the callee; and in response to receiving the explicit instruction, transmitting a call invite to the device via the signalling connection, thereby causing the device to output an incoming call notification.

In embodiments, the steps may be implemented by a client application running on the processor. In some such embodiments: the client application may comprise an API; the connection establishment message may be transmitted by invoking a call preparation function provided by the API of the client application; and the call invite is transmitted by invoking a call placement function provided by the API of the client application, the call placement function being separate from the call preparation function.

In embodiments, the detected action may be the user inputting a query at the user interface to be transmitted from the processor to a search engine via the network; wherein the callee may be identified from a search result received at the processor from the search engine via the network, the search result having been returned by the search engine in response to the query.

In embodiments, the explicit instruction may be a voice instruction spoken by the user.

In embodiments, the candidate callee may be identified based on an electronically-stored call history of the user, the callee candidate being an entity which the call history indicates the user has called at least once before. In some such embodiments, the method may comprise determining a call likelihood metric for the entity based on the call history, wherein the transmitting of the connection establishment message before the explicit instruction has been received is conditional on the determined metric satisfying one or more conditions. For example, the metric may be a probability of the user calling the callee, and the connection establishment message may be transmitted before the explicit instruction has been received only if the probability is above a threshold; or the metric may be a ranking of the callee relative to other entities which the user has called, and the connection establishment message may be transmitted before the explicit instruction has been received only if the entity is one of a predetermined number of highest ranked entities.

In embodiments, the method may comprise controlling, by the processor, a display of the user interface to display a visual representation of the callee, wherein the detected action may be the user interacting with the visual representation. In some such embodiments, the action may be the user controlling a cursor displayed on the display to hover over the visual representation. In other such embodiments, the action may be the user selecting the visual representation, wherein said selection of the visual representation is separate from the explicit instruction to instigate the call (e.g. the user selecting the visual representation causes the processor to control the display to display contact details of the callee).

In embodiments, the user interface may be configured to allow a user to mark contacts in an electronically-stored address book as favourite contacts by updating favourite contact data in the address book; and the candidate callee may be one of the user's favourite contacts, and may be identified by the prediction algorithm based on the favourite contact data.

In embodiments, the network address may be a network address of a network node of the network other than the device available to the callee, and the network node may relay the call invite to that device.

In embodiments, the network address may be a network address of the device available to the callee.

In embodiments, the network may have multiple network layers, and the signalling connection may be established at a transport layer of the network layers. E.g. the signalling connection may be a TCP connection.

According to another aspect disclosed herein, there may be provided a user device comprising: a network interface configured to connect to a network; a user interface configured to receive user inputs; a memory configured to hold software instruction configured to provide a behaviour prediction algorithm, wherein the behaviour prediction algorithm is configured to predict a call by monitoring the user inputs to detect an action by the user that suggests the user may be about to instigate a call to a callee, and identify a candidate callee for the call; and a processor configured to execute the software instructions, the software instruction configured when executed on the processor to implement the following steps: accessing a data store to retrieve a network address associated with the callee in the data store; in response to the behaviour detection algorithm predicting the call, transmitting a connection establishment message to the network address via the network interface, so as to establish over the network a signalling connection for transmitting messages to a device available to the callee; after the connection establishment message has been transmitted, receiving from the user via the user interface an explicit instruction to instigate the call to the callee; and in response to receiving the explicit instruction, transmitting a call invite to the device via the signalling connection, thereby causing the device to output an incoming call notification.

According to another aspect disclosed herein, there may be provided a computer program product comprising executable software stored on a computer readable storage medium, the software configured to provide a behaviour prediction algorithm and to implemented, when executed on a processor, the following steps: receiving user inputs from a user via a user interface, wherein the behaviour prediction algorithm predicts a call by: monitoring the user inputs to detect an action by the user that suggests the user may be about to instigate the call, and identifying a candidate callee for the call; accessing a data store to retrieve a network address associated with the callee in the data store; in response to the behaviour detection algorithm predicting the call, transmitting a connection establishment message to the network address via a network, so as to establish over the network a signalling connection for transmitting messages to a device available to the callee; after the connection establishment message has been transmitted, receiving from the user via the user interface an explicit instruction to instigate the call to the callee; and in response to receiving the explicit instruction, transmitting a call invite to the device via the signalling connection, thereby causing the device to output an incoming call notification.

In embodiments, the executable software may take the form of a client application and: the client application may comprise an API; the connection establishment message may be transmitted by invoking a call preparation function provided by the API of the client application; and the call invite may be transmitted by invoking a call placement function provided by the API of the client application, the call placement function being separate from the call preparation function.

In further alternative or additional embodiments, the user device and/or computer program product may be further configured in accordance with any one or more of the above embodiments.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user devices (user terminals) may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented call establishment method comprising performing, on a processor executing a behaviour detection algorithm, operations comprising:
receiving user inputs from a user via a user interface, wherein the behavior prediction algorithm predicts a call by: monitoring the user inputs to detect an action by the user that suggests the user may be about to instigate the call, and identifying a candidate callee for the call, wherein the candidate callee is identified based on a stored call history of the user, the callee candidate indicated by the call history as having been called by the user at least once before;
accessing a data store to retrieve a network address associated with the callee in the data store, the network address associated with the callee comprising a network address of a user device of the callee or a network address of a network address translator (NAT) connected to the user device of the callee;
determining that a first condition of a call likelihood metric is satisfied based upon one of: a probability of the user calling the callee is above a threshold or a ranking of the callee relative to other entities which the user has called is one of a predetermined number of highest ranked entities;
if the behaviour detection algorithm predicts the call and the first condition is satisfied prior to receiving an explicit instruction to instigate a call to the callee, transmitting a connection establishment message to the network address associated with the callee via a network, so as to establish over the network a signalling connection for transmitting messages to the user device of the callee;
after the connection establishment message has been transmitted, receiving from the user via the user interface the explicit instruction to instigate the call to the callee; and
after receiving the explicit instruction, transmitting a call invite to the user device via the signalling connection, thereby causing the user device to output an incoming call notification.

2. A method according to claim 1, wherein the operations are implemented by a client application running on the processor.

3. A method according to claim 2, wherein:
the client application comprises an API;
the connection establishment message is transmitted by invoking a call preparation function provided by the API of the client application; and
the call invite is transmitted by invoking a call placement function provided by the API of the client application, the call placement function being separate from the call preparation function.

4. A method according to claim 1, wherein the detected action is the user inputting a query at the user interface to be transmitted from the processor to a search engine via the network; and
  wherein the callee is identified from a search result received at the processor from the search engine via the network, the search result having been returned by the search engine in response to the query.

5. A method according to claim 1 wherein the explicit instruction is a voice instruction spoken by the user.

6. A method according to claim 1 comprising:
  controlling, by the processor, a display of the user interface to display a visual representation of the callee, wherein the detected action is the user interacting with the visual representation.

7. A method according to claim 6 wherein the action is the user controlling a cursor displayed on the display to hover over the visual representation.

8. A method according to claim 6 wherein the action is the user selecting the visual representation, wherein said selection of the visual representation is separate from the explicit instruction to instigate the call.

9. A method according to claim 8 wherein the user selecting the visual representation causes the processor to control the display to display contact details of the callee.

10. A method according to claim 1, wherein the user interface is configured to allow a user to mark contacts in an electronically-stored address book as favourite contacts by updating favourite contact data in the address book; and
  wherein the candidate callee is one of the user's favourite contacts, and is identified by the prediction algorithm based on the favourite contact data.

11. A method according to claim 1, wherein the network address is a network address of a network node of the network other than the user device of the callee, wherein the network node relays the call invite to the user device of the callee.

12. A method according to claim 1 wherein the network address is a network address of the user device of the callee.

13. A method according to claim 1, wherein the network has multiple network layers, and the signalling connection is established at a transport layer of the network layers.

14. A method according to claim 13, wherein the signalling connection is a TCP connection.

15. A user device comprising:
  a network interface configured to connect to a network;
  a user interface configured to receive user inputs;
  a memory configured to hold software instruction configured to provide a behaviour prediction algorithm, wherein the behaviour prediction algorithm is configured to predict a call by monitoring the user inputs to detect an action by the user that suggests the user may be about to instigate a call to a callee, and identify a candidate callee for the call, wherein the candidate callee is identified based on a stored call history of the user, the callee candidate indicated by the call history as having been called by the user at least once before; and
  a processor configured to execute the software instructions, the software instruction configured when executed on the processor to implement operations comprising:
  accessing a data store to retrieve a network address associated with the callee in the data store, the network address associated with the callee comprising a network address of a callee user device or a network address of a network address translator (NAT) connected to the callee user device;
  determining that a first condition of a call likelihood metric is satisfied based upon one of: a probability of the user calling the callee is above a threshold or a ranking of the callee relative to other entities which the user has called is one of a predetermined number of highest ranked entities;
  if the behaviour detection algorithm predicts the call and the first condition is satisfied prior to receiving an explicit instruction to instigate a call to the callee, transmitting a connection establishment message to the network address associated with the callee via the network interface, so as to establish over the network a signalling connection for transmitting messages to the callee user device;
  after the connection establishment message has been transmitted, receiving from the user via the user interface the explicit instruction to instigate the call to the callee; and
  after receiving the explicit instruction, transmitting a call invite to the callee user device via the signalling connection, thereby causing the callee user device to output an incoming call notification.

16. A computer program product comprising executable software stored on a computer readable storage medium, the software configured to provide a behaviour prediction algorithm and to, when executed on a processor, perform operations comprising:
  receiving user inputs from a user via a user interface, wherein the behavior prediction algorithm predicts a call by: monitoring the user inputs to detect an action by the user that suggests the user may be about to instigate the call, and identifying a candidate callee for the call, wherein the candidate callee is identified based on a stored call history of the user, the callee candidate indicated by the call history as having been called by the user at least once before;
  accessing a data store to retrieve a network address associated with the callee in the data store, the network address associated with the callee comprising a network address of a user device of the callee or a network address of a network address translator (NAT) connected to the user device of the callee;
  determining that a first condition of a call likelihood metric is satisfied based upon one of: a probability of the user calling the callee is above a threshold or a ranking of the callee relative to other entities which the user has called is one of a predetermined number of highest ranked entities;
  if the behaviour detection algorithm predicts the call and the first condition is satisfied prior to receiving an explicit instruction to instigate a call to the callee, transmitting a connection establishment message to the network address associated with the callee via a network, so as to establish over the network a signalling connection for transmitting messages to the user device of the callee;
  after the connection establishment message has been transmitted, receiving from the user via the user interface the explicit instruction to instigate the call to the callee; and
  after receiving the explicit instruction, transmitting a call invite to the user device via the signalling connection, thereby causing the user device to output an incoming call notification.

17. A computer program product according to claim 16, wherein the executable software is in the form of a client application and:
- the client application comprises an API;
- the connection establishment message is transmitted by invoking a call preparation function provided by the API of the client application; and
- the call invite is transmitted by invoking a call placement function provided by the API of the client application, the call placement function being separate from the call preparation function.

* * * * *